United States Patent [19]

Kaneko

[11] Patent Number: 5,162,921

[45] Date of Patent: Nov. 10, 1992

[54] CLAMP FOR VIDEO SIGNAL PROCESSING CIRCUIT

[75] Inventor: Shinji Kaneko, Kanagawa, Japan

[73] Assignee: Sony Corporation, Tokyo, Japan

[21] Appl. No.: 492,808

[22] Filed: Mar. 13, 1990

[30] Foreign Application Priority Data

Mar. 24, 1989 [JP] Japan .................................. 1-73371

[51] Int. Cl.⁵ .............................................. H04N 5/76
[52] U.S. Cl. ..................................... 358/335; 358/315; 358/310
[58] Field of Search ............... 358/335, 327, 310, 339, 358/315, 160, 172, 171, 178, 13, 34, 148, 153, 316; 360/32, 27, 43, 33.1

[56] References Cited

U.S. PATENT DOCUMENTS

| | | |
|---|---|---|
| 3,381,083 | 4/1968 | Jensen et al. |
| 3,643,013 | 2/1972 | Lemoine |
| 4,286,290 | 8/1981 | Pyles et al. |
| 4,802,024 | 1/1989 | Knowlton ........................ 360/36.1 |
| 4,853,782 | 8/1989 | Asano et al. ........................ 358/148 |

OTHER PUBLICATIONS

The Electronics and Wireless World Article, vol. 90, No. 1585, Nov. 1984, pp. 31-34, J. R. Watkinson, "Variable-Speed Video Playback".

Primary Examiner—Tommy P. Chin
Assistant Examiner—Robert Chevalier
Attorney, Agent, or Firm—Ronald P. Kananen

[57] ABSTRACT

A video signal processing circuit utilizes an analog-to-digital converter to output a digital signal derived from a demodulated video signal which is supplied from a video signal demodulating circuit. The circuit can compensate the demodulated video signal by utilizing the conversion characteristics of an analog-to-digital converter, to compensate the level differences or linearity differences between the video signal reproducing channels in a video tape recorder employing multi-channel recording.

14 Claims, 2 Drawing Sheets

CLAMP FOR VIDEO SIGNAL PROCESSING CIRCUIT

BACKGROUND OF THE INVENTION

1. Field of Invention

This invention relates generally to a video signal processing circuit used in a video signal reproducing apparatus, and is more particularly directed to a video signal processing circuit having an analog-to-digital converter for converting a reproduced video signal to a digital video signal.

2. Description of the Prior Art

The goal of getting a high definition television picture, using a high definition video system (HDVS), which processes the wide band video signal with increased scanning lines, has developed in recent years.

In the video tape recorder which records or reproduces the wide band video signal used in said HDVS, it has been tried to record said wide band one field signal in the same way as in the former video tape recorder, with one field signal in the same way as in the former video tape recorder, in which one field video signal is recorded in only one track. The result is that the diameter of head drum becomes a few times larger than usual, so it is not practical. Segment recording or multi-channel recording, could be used in which the wide band, one field signal would be recorded into plural tracks by being divided into plural segments.

In said multi-channel recording, for example, by dividing the wide band video signal into two channels in the recording process, the video signal of each channel is time base expanded, frequency modulated, and recorded into the recording media. In the reproducing process, each channel video signal reproduced from the recording media is frequency demodulated, time base compressed respectively, and as an original video signal corresponding to one channel is reproduced. Furthermore, said time base expanding and time base compression are processed digitally, wherein the video signal is digitized.

By the way, in the recording system of a video tape recorder which employs multi-channel recording, the most important factor determining the definition of a reproducing signal is whether there are level differences and linearity differences between channels, especially in the case of analog recording. After the video signal which was divided into several channels is processed independently with the demodulating circuit, video amplifier, analog-to-digital converter etc. which exist in each channel, said divided video signal will be reconstructed into the corresponding single channel video signal. There was the difference of signal level and signal linearity in the processing each circuits of channel, for example, in case of the same video signal was recorded and reproduced, there was the difference between the signal from each channel. This is the one of the causes for loss of definition of a reproduced video signal.

OBJECTS AND SUMMARY OF THE INVENTION

Accordingly, it is an object of the present invention to provide a novel reproduced video signal processing circuit free from defects encountered in the prior art circuit.

Another object of the present invention is to provide a reproduced video signal processing circuit which can compensate for level differences or linearity differences between video signal reproducing channels.

A further object of the present invention is to provide a reproduced video signal processing circuit which can compensate for undesirable characteristics of a reproduced video signal by utilizing the conversion characteristics of an analog-to-digital converter for converting the reproduced video signal to a digital video signal.

The above and other objects and features of the invention will be apparent from the following description of the invention and the accompanying drawings.

DETAILED DESCRIPTION OF A PREFERRED EMBODIMENT

Figure 1:
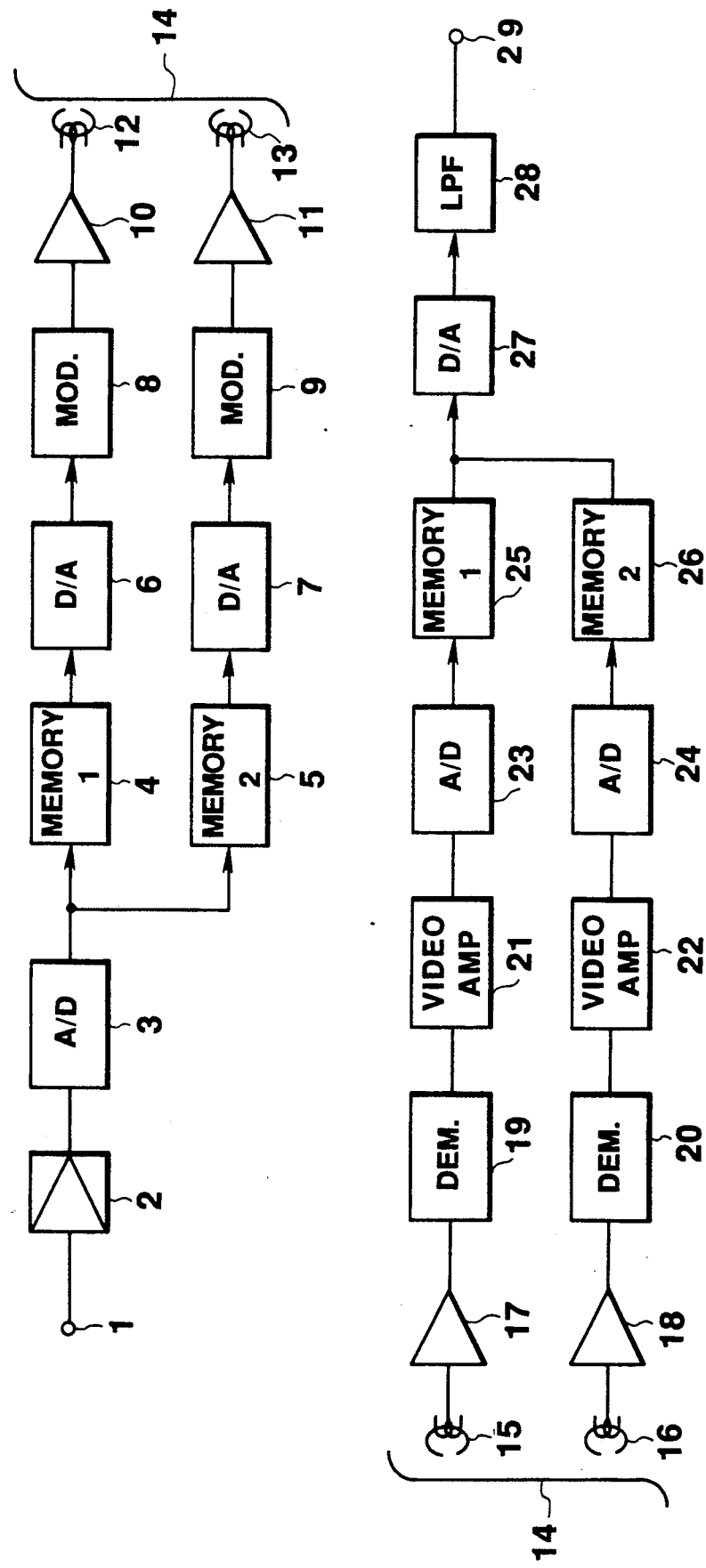
FIG. 1 is a block diagram of a VTR system using multi-channel channel recording to which the present invention can be applied.

Before explaining the preferred embodiment of the present invention, a video tape recorder, in which the present invention can be adopted, is explained referring to FIG. 1.

FIG. 1 is a schematic block diagram of the recording and reproducing process in a VTR system using multi-channel recording, said VTR system having a wide band video signal, for example HDVS.

In FIG. 1, there is an input terminal 1 of a wide band video signal to be recorded. The video signal, supplied to said terminal 1, is supplied to an analog-to-digital converting circuit 3 through the video amplifier 2. The video signal is converted into a digital video signal by utilizing said analog-to-digital converting circuit. A digital video signal is alternatively stored line by line to first memory 4 and to second memory 5, respectively. Digital video signal written into memories 4 and 5 are for read out by read clocks which are for example half the frequency of a write clock. At that time, the time bases of reading out the digital video signals are expanded by a factor of two. The output signals from these memories 4 and 5 are supplied respectively to digital-to-analog converters 6 and 7 wherein the output signals will be narrow band video signals in which time bases are expanded. The output video signals from digital-to-analog converters 6, 7 are supplied to frequency modulaters 8, 9, respectively, and the obtained frequency modulated signals are supplied to rotating magnetic heads 12, 13 through recording amplifiers 10, 11 for recording into magnetic tape 14 in the form of two channel FM signals.

The recording process was explained in the above. In the reproducing process, two-channel FM signals recorded an tape 14 are reproduced by rotating magnetic heads 15, 16. Said FM signals are demodulated by FM demodulaters 21, 22 after passing through reproducing amplifier 17, 18. Said FM demodulated video signals, comprising two narrow band channels, are supplied to analog-to-digital converters 23, 24 for converting each channel of the video signal to a corresponding digital video signal.

Said digital video signals are written with a predetermined clock into memories 25, 26 the same way as in the recording process. For example, said digital signals are read out at twice the rate of said predetermined write clock for compressing the time base one half. After this the two-channel signals are converted into one channel serial signal, which is supplied to a digital-to-analog converter 27. An analog video signal converted by said digital-to-analog converter 27 is output to terminal 29 through the low-pass-filter 28. So, the same wide band video signal as the recorded signal is obtained at the terminal 29.

Next, the embodiment of this invention, for application to the reproducing system of a VTR as shown in FIG. 1, will be explained referring to the accompanying drawings.

Figure 2:
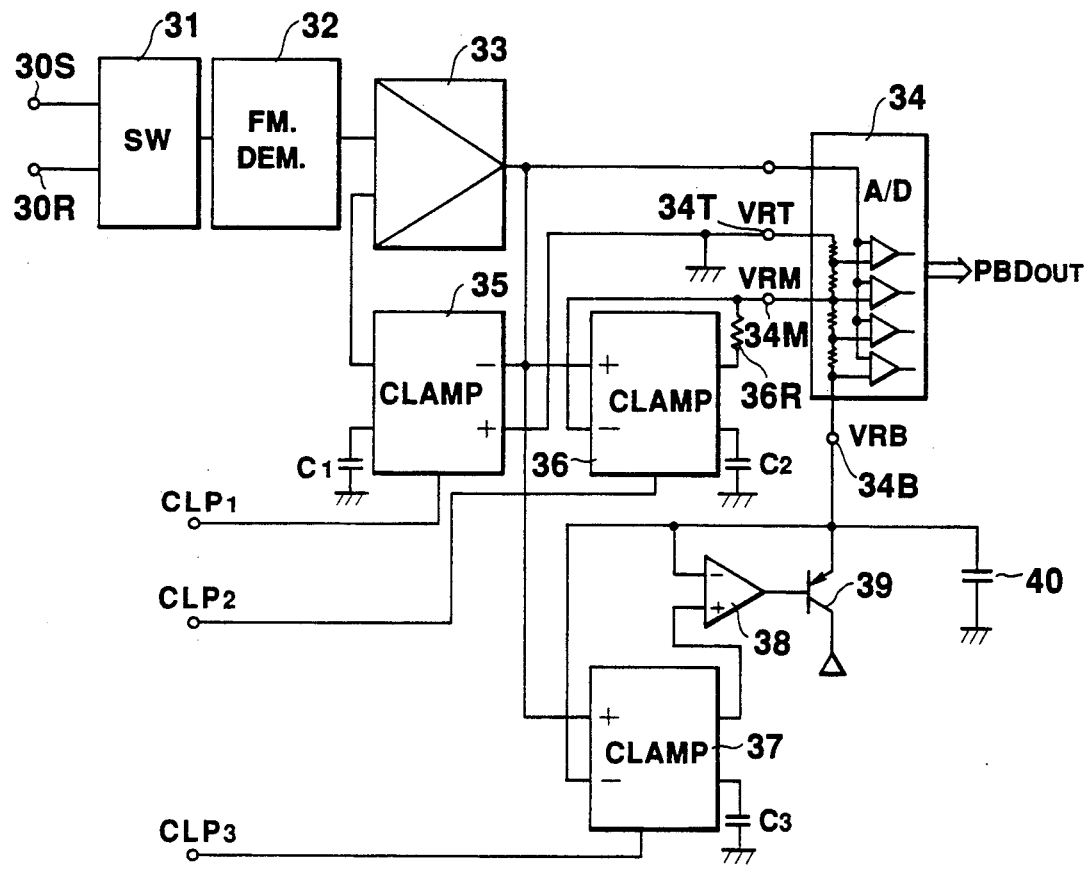
FIG. 2 is a block diagram showing an embodiment of the present invention.

The embodiment shown in FIG. 2 as a block diagram shows the application of this invention to a reproducing process of a video tape recorder which processes a high definition television signal by multi-channel recording, for example, as shown in FIG. 1. A reproduced RF video signal $PB_{IN}$, which is reproduced from a recording media, is supplied to the input terminal 30S. Said RF video signal $PB_{IN}$ is demodulated by a FM demodulating circuit 32. The demodulated video signal is converted into the reproduced digital video data $PBD_{OUT}$ by digitizing with an analog-to-digital converter 34.

In this video signal processing circuit, there is the switching circuit 31 which is located at the input side of said FM demodulating circuit 32. This switching circuit 31 can be operated to provide an input into said FM demodulating circuit 32, that is, by inserting a reference frequency signal $REF_{IN}$ supplied from input terminal 30R into said reproduced RF video signal $PB_{IN}$. Further the demodulated output signal from said FM demodulating circuit 32 can be input into said analog-to-digital converter 34 through an amplifier 33.

Said analog-to-digital converter 34 has a first reference voltage terminal 34T to which a maximum reference voltage is supplied, a second reference voltage terminal 34M to which an intermediate reference voltage is supplied and a third reference voltage terminal 34B to which a minimum reference voltage is supplied. The first reference voltage terminal 34T is connected to one of the input terminal of a first clamp circuit 35. The second reference voltage terminal 34M is connected to one of the input terminal of a second clamp circuit 36. The third reference voltage terminal 34B is connected to one of the input terminal of a third clamp circuit 37 and to one of the input terminals of an operational amplifier 38. Said third reference voltage terminal 34B is also connected to a negative source terminal through a PNP transistor 39. This third reference voltage terminal 34B is connected to ground through a condenser 40. The other input terminals of said first, second and third clamp circuits 35, 36, 37 are supplied from the output terminal of said amplifier 33.

The output terminal of said first clamp circuit 35 is connected to the reference input terminal of said amplifier 33. The output terminal of said second clamp circuit 36 is connected to said second reference voltage terminal 34M of said analog-to-digital converter 34 through a resistor 36R. The output terminal of said third clamp circuit 37 is connected to the other input terminal of said operational amplifier 38. The output terminal of the operational amplifier 38 is connected to the base of said PNP transistor 39. Clamping condensers $C_1$, $C_2$, $C_3$ are connected to the first, second and third clamp circuits 35, 36, 37, respectively. These first, second and third clamp circuits 35, 36, 37 are for example comparing circuits comprised in a differential operation. They are only enabled to compare inputs when clamp pulses $CLP_1$, $CLP_2$, $CLP_3$ are supplied to the control terminals of these clamp circuits. Then the compared outputs are held by said clamping condensers $C_1$, $C_2$, $C_3$, thus each voltage held by said condenser is output as each output of said clamp circuit.

Figure 3A:
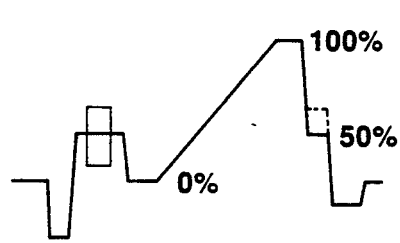
FIGS. 3A and 3B are waveform diagrams used in explaining the operation of the embodiment of FIG. 2.
Figure 3B:
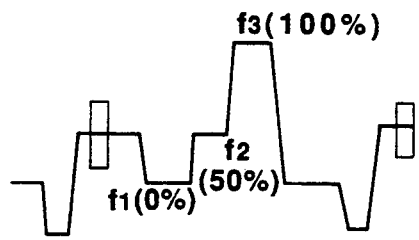

In such a video signal processing circuit composed as mentioned above, for example, the recording procedure includes the process wherein a predetermined standard video signal, such as shown in FIG. 3A, whose level varies from 0% to 100%, is inserted into a scanning line in correspondence to one horizontal scanning period within a frame period of video signal. A first frequency $f_1$ corresponds to a 0% signal level, a second frequency $f_2$ corresponds to a 50% signal level, and a third frequency $f_3$ corresponds to a 100% signal level. Accordingly, a reference frequency signal is provided, such as the above waveform being inserted into a reproduced RF video signal $PB_{IN}$. Said reference frequency signal is supplied to the FM demodulating circuit 32. Alternately, the reference frequency signal $REF_{IN}$, corresponding the level as shown in FIG. 3B, can be supplied directly through a switch circuit 31.

In either case of using a reference frequency signal, said reference frequency signal $REF_{IN}$ will be FM demodulated by utilizing the FM demodulating circuit 32. As shown in FIG. 3B, the demodulated output based on the frequency $f_1$ will be obtained with a correspondence to the 0% signal level of the standard video signal, said output based on the frequency $f_2$ will be obtained with a correspondence to the 50% signal level of said video signal, and said output based on the frequency $f_3$ will be obtained with a correspondence to the 100% signal level of said video signal.

Accordingly, in the video signal processing circuit of this embodiment, the reproduced video signal $PBD_{OUT}$ composed with 8 bits is derived from said analog-to-digital converter 34 which digitizes the demodulated video signal supplied from said FM demodulating circuit 32. For example, said 0% signal level corresponds to step value 0, said 50% signal level corresponds to step value 127, and said 100% signal level corresponds to step value 255.

A clamping pulse $CLP_1$ is derived from the timing of the signal of said frequency $f_1$ within the reference frequency signal $REF_{IN}$ inserted by said switching circuit 31 into said reproduced RF video signal $PB_{IN}$. Said clamping pulse samples the demodulated output, which is supplied into said analog-to-digital converter 34 through said amplifier 33, as derived from said FM demodulating circuit 32. The demodulated output sampled by said clamping pulse is compared with the voltage which is supplied to the first reference voltage terminal 34T, which in this case is at ground level. The output voltage which is obtained by comparing these two voltages is supplied into the reference voltage terminal of said amplifier 33. So, said first clamping circuit 35 clamps the demodulated output of said 0% signal level corresponding to said frequency $f_1$ at the maximum reference voltage VTR which is generated at said first reference voltage terminal 34T of said analog-to-digital converter 34. Thus, in this embodiment, a fixed voltage is supplied to the first reference voltage terminal 34T of said analog-to-digital converter 34. The demodulated output is clamped at a level which is equal to the 0% signal level corresponding said frequency $f_1$.

Subsequently, a clamping pulse $CLP_3$ is derived from the timing of the signal of said frequency $f_3$ within the reference frequency signal $REF_{IN}$ inserted by said switching circuit 31 into said reproduced RF video signal $PB_{IN}$. Said clamping pulse samples the demodulated output, which is supplied into said analog-to-digital converter 34 through said amplifier 33, as derived from said FM demodulating circuit 32. The demodulated output which has been sampled by said clamping pulse is compared with the voltage VRB which is supplied to the third reference voltage terminal 34B. The output voltage which is obtained by comparing both said voltages is supplied into the non-reversed input terminal of the operational amplifier 38. The PNP transistor 39 is controlled by the output of said operational amplifier 38. Thus, the voltages of both terminals of a condenser 40 are controlled in this sequence. This way the third clamping circuit 37 clamps the demodulated output of said 100% signal level corresponding to said frequency $f_3$ at the minimum reference voltage VRB which is generated at said third reference voltage terminal 34B of said analog-to-digital converter 34.

The output of said analog-to-digital converter 34 is 0 corresponding to the 0% signal level and is 255 corresponding to the 100% signal level, as provided by the feed-back loop of said first and third clamping circuits 35, 37, respectively.

For compensating the intermediate value between 0% output (0) and the 100% output (255) of said analog-to-digital converter 34 in the similar way described hereafter, a clamping pulse $CLP_2$ is derived from the timing of the signal of said frequency $f_2$ within the reference frequency signal $REF_{IN}$ inserted by said switching circuit 31 into said reproduced RF video signal $PB_{IN}$. Said clamping pulse samples the demodulated output, which is supplied into said analog-to-digital converter 34 through said amplifier 33, as derived from said FM demodulating circuit 32. The demodulated output which has been sampled by said clamping pulse is compared with the intermediate voltage VRM which is supplied to the second reference voltage terminal 34M of the A/D converter 34. Said intermediate voltage VRM is controlled by the output voltage which is obtained by comparing both said voltages through a resistor 36R. Thus, said second clamping circuit 36 clamps the demodulated output of said 50% signal level corresponding to said frequency $f_2$ at the intermediate reference voltage VRM which is provided at said second reference voltage terminal 34M of said analog-to-digital converter 34.

As above mentioned, the reference frequency signal, $REF_{IN}$, which includes each frequency $f_1$, $f_2$ and $f_3$ corresponding to the 0% signal level, the 50% signal level and the 100% signal level of the reference video signal respectively, is inserted into said reproduced RF video signal $PB_{IN}$ by said switching circuit 31. The converting characteristics of said analog to digital converter 34 as thus be compensated at these points by the demodulated output, corresponding to said reference frequency signal $REF_{IN}$, obtained from said FM demodulating circuit 32. In the video signal processing circuit of this embodiment, the whole demodulating system including said FM demodulating circuit 32, amplifier 33 and analog-to-digital converter 34 can compensate for the level differences and the linearity differences of a reproduced video signal.

The high definition television signal would be reproduced by providing said video signal processing circuit in each channel, for eliminating differences between each channel. Furthermore, in the above mentioned embodiment, the conversion characteristics of an analog-to-digital converter are compensated at three points. However, it is possible to obtain the same purpose and advantages, wherein the maximum voltage and the minimum voltage, which are supplied to the reference voltage terminals of an analog-to-digital converter, are correspond to the demodulated output levels of frequencies $f_1$, $f_3$ inserted in the reproduced RF video signal $PB_{IN}$. That is, it is also practical that the conversion characteristics of an analog-to-digital converter be compensated at two points. Further, the maximum voltage, supplied to the reference voltage terminal of an analog-to-digital converter, is fixed in the first embodiment described above. The demodulated output was clamped as for equalizing said maximum voltage to said demodulated output of the frequency $f_1$ corresponding to the 0% signal level. However, by clamping the video signal at predetermined voltage free from the reference voltage of an analog-to-digital converter, the maximum, the intermediate and the minimum voltages which are supplied to the reference voltage terminals of said analog-to-digital converter may be clamped for equalizing the demodulated output level of a reference signal.

The reference signal, which provide at least for the reference maximum signal level and the reference minimum signal level of the video signal supplied to a demodulating circuit, are supplied to said demodulating circuit by the reference signal supplying means. The first and the second clamping circuits determine the voltages at the first and the second reference voltage terminals of an analog-to-digital converter, which voltages result from the demodulated output from said demodulating circuit and which corresponded said reference signal. The level difference and the linearity difference of a video signal could be compensated for the whole circuit. The demodulated video signal derived from said demodulating circuit is digitized by said analog-to-digital converter. It is possible to provide a video signal processing circuit in which the demodulated video data is obtained within the whole circuit. The level difference and the linearity difference of said demodulated video data are compensated.

By applying the video signal processing circuit of to this invention to each channel of a multi-channel reproducing system of a video tape recorder, it is possible to remove the level differences and the linearity differences among channels. Thus, the a reproduced video signal having an excellent high definition can be obtained.

I claim:

1. A video signal processing circuit used in a video signal reproducing apparatus comprising:
   demodulation means for demodulating a reproduced modulated video signal and for generating a video signal,
   inserting means for inserting at least a first frequency signal corresponding to a maximum level of said video signal and a second frequency signal corresponding to a minimum level of said video signal into respective predetermined portions of said reproduced modulated video signal,
   analog-to-digital converting means having a first reference voltage terminal to which a maximum reference voltage is supplied and a second reference voltage terminal to which a minimum reference voltage is supplied, for converting said video signal which is supplied thereto from said demodulating means to a digital video signal, first clamp means for clamping one of said maximum reference voltage and said video signal such that said maximum reference voltage becomes equal to a demodulated level of one of said first and second frequency signals, and second clamp means for clamping one of said minimum reference voltage and said video signal such that said minimum reference voltage becomes equal to a demodulated level of the other of said first and second frequency signals.

2. A video signal processing circuit according to claim 1, wherein said analog-to-digital converting means further includes a third reference voltage terminal to which an intermediate reference voltage is supplied, said inserting means further inserts a third frequency signal corresponding to an intermediate level of said video signal into a respective predetermined portion of said reproduced modulated video signal, and further comprising third clamp means for clamping said intermediate reference voltage such that said intermediate reference voltage becomes equal to a demodulated level of said third frequency signal.

3. A video signal processing circuit according to claim 1, wherein said inserting means includes switching means for selecting one of said reproduced modulated video signal and said first and second frequency signals, said switching means receiving said reproduced modulated video signal and having an output which to provide an input to said demodulating means, said output at any time being the selected switched signal.

4. A video signal processing circuit according to claim 1, wherein said first clamping means includes comparator means for comparing said maximum reference voltage and said demodulated level of the respective one of said first and second frequency signals, holding means for holding the output of said comparator means, and control means for controlling the DC level of said video signal in response to the output of said holding means.

5. A video signal processing circuit according to claim 4, wherein said control means of said first clamping means include amplifier means having a first input terminal to which said video signal is supplied, a second input terminal to which the output of said holding means is supplied and an output terminal connected to said analog-to-digital converting means.

6. A video signal processing circuit according to claim 2, wherein said inserting means includes switching means for selecting one of said reproduced modulated video signal and said first, second and third frequency signals.

7. A video signal processing circuit according to claim 1, wherein said first clamping means includes comparator means for comparing said maximum reference voltage and said demodulated level of the respective one of said first and second frequency signals, holding means for holding the output of said comparator means, and control means for controlling the DC level of said first reference voltage terminal in response to the output of said holding means.

8. A video signal processing circuit according to claim 1, wherein said second clamping means includes respective comparator means for comparing said minimum reference voltage and said demodulated level of the respective one of said first and second frequency signals, holding means for holding the output of its comparator means, and respective control means for controlling the DC level of said second reference voltage terminal of said analog-to-digital converting means in response to the output of its holding means.

9. A video signal processing circuit according to claim 8, wherein said holding means for holding the output of said comparator means of said second clamp means, for said controlling of the DC level of said second reference voltage terminal of said analog-to-digital converting means, comprises a transistor connected between said second reference voltage terminal and a sufficiently low constant voltage source.

a differential amplifier having one input terminal connected to said second reference voltage terminal, and a capacitor connected between said second reference voltage terminal and ground.

10. A video signal processing circuit according to claim 2, wherein third clamping means includes respective comparator means for comparing said intermediate reference voltage and said demodulated level of the respective one of said first and second frequency signals, holding means for holding the output of its comparator means, and respective control means for controlling the DC level of said intermediate reference voltage in response to the output of its holding means.

11. A video signal processing circuit according to claim 10, wherein said control means of said third clamp means for said controlling of the DC level of said intermediate reference voltage of said analog-to-digital converting means includes a resistor connected to said third reference voltage terminal of said analog-to-digital converting means.

12. A video signal processing circuit according to claim 3, further comprising timing means for controlling said selecting by said switching means and the operation of said first and second clamp means for making the respective maximum and minimum reference voltages equal to the respective first and second frequency signals.

13. A video signal processing circuit according to claim 6, further comprising said first clamping means includes comparator means for comparing said maximum reference voltage and said demodulated level of the respective one of said first and second frequency signals, holding means for holding the output of said comparator means, and control means for controlling the DC level of said video signal in response to the output of said holding means, said second clamping means includes respective comparator means for comparing said minimum reference voltage and said demodulated level of the respective one of said first and second frequency signals, holding means for holding the output of its comparator means, and respective control means for controlling the DC level of said second reference voltage terminal of said analog-to-digital converting means in response to the output of its holding means, said third clamping means includes respective comparator means for comparing said intermediate reference voltage and said demodulated level of the respective one of said first and second frequency signals, holding means for holding the output of its comparator means, and respective control means for controlling the DC level of said intermediate reference voltage in response to the output of its holding means, and timing means for controlling said selecting by said switching means and the operation at different respective times of said first, second and third clamp means for the respective ones of said comparing, holding and controlling of voltages.

14. A multi-channel video reproducing system wherein each said channel employs its own video signal processing circuit according to the video signal processing circuit of claim 1, wherein differences of levels in each channel can be compensated in an output video signal of the multi-channel video reproducing system which is reconstructed from all the channels.

* * * * *